United States Patent Office 2,837,623
Patented June 3, 1958

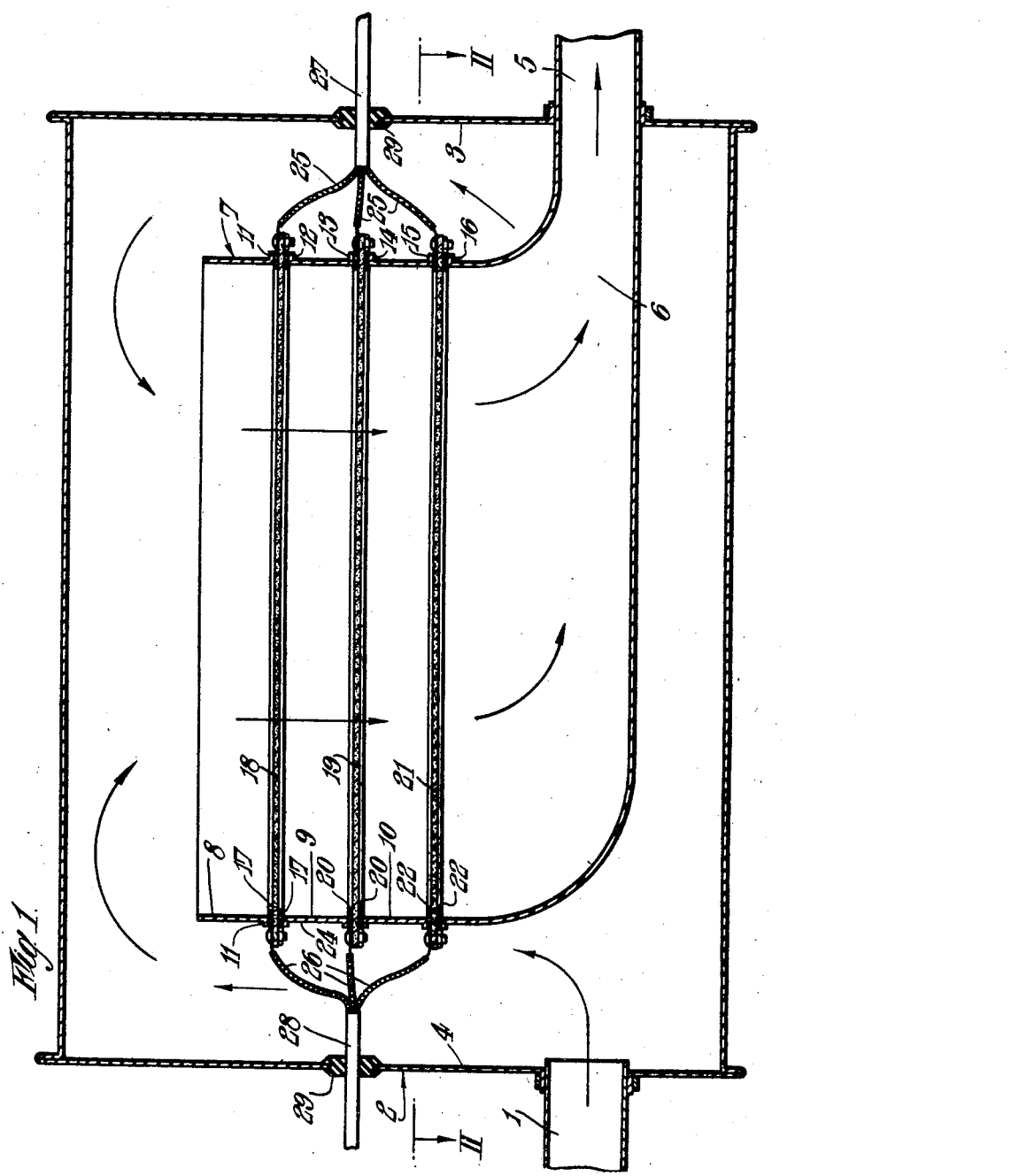

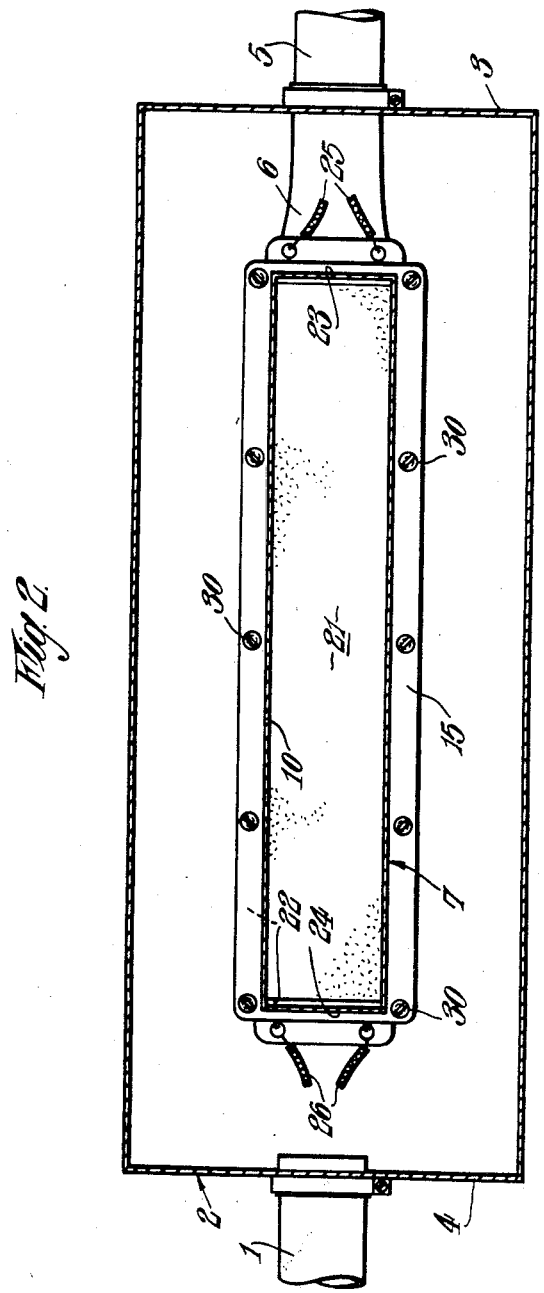

2,837,623

TREATMENT OF FLUIDS

Charles Alan Judson, Solihull, and George McLeish Collins, Birmingham, England, assignors to The Birmingham Small Arms Company Limited, Birmingham, England, a British company Application May 13, 1957, Serial No. 658,733

Claims priority, application Great Britain May 26, 1956

4 Claims. (Cl. 219—39)

This invention relates to the treatment of fluids, and in particular to the heating of fluids.

According to the invention, a method of heating a fluid comprises causing the fluid to pass through a porous body to which heat is applied or in which heat is generated.

Preferably the porous body is of metal, and it may conveniently be produced by powder metallurgy methods.

The heat applied to or generated in the porous body may be generated electrically.

Where the porous body is of metal or of other electrically conducting material, heat is preferably applied to the porous body by causing an electric current to pass through the body, the electrical resistance of the body to the passage of the electric current causing heat to be generated therein.

The fluid may be caused to pass through the porous body under regulable pressure.

Apparatus for carrying out the said method preferably consists of a porous body of metal or other electrically conducting material disposed in a passage through which fluid is caused to flow under pressure which may be regulable, and means for applying an electric current across the porous body, such that heat is generated in the body due to its electrical resistance to the passage of the electric current, the heat generated causing heating of the fluid as it passes through the porous body.

In the accompanying drawings, which illustrate a constructional example,

Figure 1 is a side view in section of apparatus for performing the said method, and Figure 2 is a plan view in section taken on line II—II of Figure 1.

Referring to the drawings, in the construction shown therein, as applied by way of example to the heating of a gas as it flows in a stream, we provide a gas inlet pipe 1 communicating with the interior of a rectangular outer chamber 2 which is closed at the top and bottom and has in its side 3 opposite to the side 4 through which the inlet pipe 1 projects, an outlet pipe 5 which has a convergent portion 6 extending from an open-topped inner rectangular chamber 7. The inner chamber 7 is fabricated from a plurality of frames 8, 9 and 10, the top frame 8 having a flange 11 at its lower end, an intermediate frame 9 having flanges 12, 13 respectively at its upper and lower end, a further intermediate frame 10 having flanges 14, 15 respectively at its upper and lower end, and the convergent portion 6 leading to the outlet pipe 5 having a flange 16 at its upper end. Interposed between the flanges 11 and 12 is a pair of insulating rectangular annular gaskets 17 made from material having the properties of good electrical insulation and ability to withstand heat, for example moulded ceramics or suitable moulded fibrous compounds, there being a rectangular metal porous body 18 interposed between the gaskets 17 and extending across the inner chamber 7 in partition-like manner. There is a similar porous body 19 between similar gaskets 20 interposed between flanges 13 and 14, and a similar porous body 21 between similar gaskets 22 interposed between the flanges 15 and 16. Each pair of flanges is secured together by spaced screws 30.

Each of the porous bodies 18, 19 and 21 projects beyond the respective flanges and gaskets at the sides 23, 24 of the inner chamber 7 which face the sides 3 and 4 respectively of the outer chamber 2, and each projecting portion is provided with a pair of terminals, each terminal having an electric conducting lead secured to it. The leads, of which in the described construction there are six at the side 23 designated 25 and six at the side 24 designated 26, are gathered into a cable 27 which passes through the side 3 of the outer chamber 2, and a cable 28 which passes through the side 4 of the outer chamber 2, respectively. An insulating bush or lining 29 is provided for the cable opening in each of the sides 3 and 4.

Gas under regulable pressure is fed to the inlet pipe 1 and passes into the outer chamber 2 near the bottom thereof. The only outlet from the outer chamber is via the inner chamber 7, and consequently the gas rises in the outer chamber 2 and enters the inner chamber 7 through the open top thereof. The pressure of the gas causes it to be forced through the pores of the porous bodies 18, 19, 21 and from thence out of the apparatus through the portion 6 and outlet pipe 5. Current is supplied across the ends of the porous bodies 18, 19 and 21 and due to the resistance of the metal from which these bodies are fabricated, heat is generated in the porous bodies and is taken up by the gas being forced therethrough. The gas is thereby progressively and uniformly heated in its passage through the bodies 18, 19 and 21. A temperature gradient will be imparted to the inner chamber 7 by contact of the gas therewith, the higher temperature being at the lower end thereof. This lower end will have the effect of preheating the gas initially in contact with the lower end of the inner chamber 7 as it enters at the inlet pipe 1, but the amount of this preheating will be small and the rising gas in the outer chamber 2 will serve to keep the projecting portions of the porous bodies relatively cool, thereby helping to avoid overheating of the terminals and leads. In the particular construction described and illustrated, the porous bodies 18, 19 and 21 are connected in parallel, but they could if desired be connected in series. Connection in series has the disadvantage, however, that a broken lead or connection would cause all heating of the gas to cease, whereas connection in parallel would only reduce the heating by a proportion represented by the loss of heating of the particular porous body affected by the break.

It will of course be appreciated that, although three porous bodies are employed in the particular construction described and illustrated, any number of porous bodies from one upwardly can be employed as found necessary or suitable for the volumes of gas to be heated, the pressures of gas applicable, and the current to be applied to the porous bodies.

The porous bodies 18, 19, 21 are conveniently fabricated by powder metallurgical methods and in a typical example each were of 3" wide, 0.125" thick stainless steel of resistance about 0.13 ohms, a current of about 340 amps. at about 44 volts applied across the ends of the body developing 15 kilowatts therein with a current density of about 900 amps. per square inch. It has been found that with a current density of about 1000 amps. per square inch, a similar porous body of stainless steel developed a steady temperature of about 800° C. in still air. The amount of heat imparted to a gas forced through the porous body can be controlled by suitable choice of current, the pressure forcing the gas through the pores of the porous body, the pore size of the porous body, and the material of the porous body and therefore its electric resistance. The amount of heat needing to be supplied to the gas is the product of its specific heat, the mass flow and the temperature rise required in any specific case.

Although the particular apparatus described and illustrated is intended for the heating of gases, it may also be employed for performing the said method in the heating of liquids. However, it is to be noted that the heating of liquids can give rise to such difficulties as boiling and consequent gas production, and gas production resulting from dissolved gases present in the liquids and liberated by rise in temperature, any gas production tending to produce back-pressure in the chamber 2 and to block the pores of the porous bodies. The heating of electrolytes by the said method wherein electrical heating is employed can also give rise to such difficulties as current conduction by the liquid in addition or in preference to conduction by the porous bodies, gas production, with consequent back pressure and pore blockage, by electrolysis of the liquid, plating at the porous bodies and/or electrical connections, and corrosion, particularly at the electrical connections, tending to produce debris. The three last-mentioned would also lead to blockage of the pores of the porous bodies. Consequently, heating of liquids, particularly electrolytes, must only be undertaken with low current densities, relatively low upper temperature limits, relatively gas-free liquids and with particular regard paid to these difficulties. However, for non-electrolytes, for example, many organic liquids, where the upper temperature limit is not required to be too near the boiling point, and where precautions against the presence of dissolved gases therein have been taken, heating thereof can advantageously be effected by the said method and with apparatus such as has been described and illustrated.

With both gases and liquids, it is desirable to effect prefiltering by a porous body or bodies having a finer pore-size than that of the porous body or bodies employed in the said apparatus for the heating, to remove any solid material present therein. By this expedient blockage of the pores in the said apparatus is prevented or reduced, and the necessity for frequent pore-clearing is dispensed with.

An outstanding advantage of the said method is that it effects a uniform and controllable heating of fluids. This is particularly advantageous in the heating of gases, known contact methods for which are open to criticism in the lack of uniformity throughout the gas of the heating produced.

The invention may be applied for example, in the industrial heating of non-electrolytes, for example in the petroleum industry, in the domestic or industrial heating of air for air conditioning, and in the industrial heating of other gases, and is applicable in or in connection with any mechanical or chemical process involving heating of a fluid, subject to the reservations before-mentioned concerning electrolytes. It is advantageous in that, helped by the labyrinth nature of the passages in a porous body the heating of the fluid is efficient, uniform and readily controllable.

We claim:

1. A method for heating a fluid, comprising causing the fluid to pass through a porous body of electrically conducting material, and generating heat in the porous body for transfer to the fluid as it passes therethrough by passing an electric current through the porous body, the electrical resistance of the material of the porous body to the passage of the electric current causing heat to be generated in the porous body.

2. For heating a fluid, a method according to claim 1, wherein the fluid is caused to pass through the porous body under regulable pressure.

3. For heating a fluid, apparatus comprising a container having an inlet for fluid under pressure and an outlet, an electrically conducting porous body disposed in said container between said inlet and said outlet and through which said fluid must pass as it flows from the inlet to the outlet, and means for applying an electric current across said porous body whereby due to its electrical resistance, heat can be generated in the porous body for transfer to the fluid passing therethrough on its way to the outlet.

4. For heating a fluid, apparatus comprising an outer chamber having an inlet for fluid under regulable pressure, a plurality of hollow members, framed ends of said hollow members, insulating and sealing means fitting each framed end, a porous body of electrical conducting material interposed between each pair of insulating and sealing means, means for securing adjacent framed ends together for making fluid-tight joints between hollow members with parts of the porous bodies projecting beyond said joints, one hollow member having an outlet extending through a wall of said outer chamber, and electrical conducting means connected to said projecting parts of said porous bodies and extending through to the outside of said outer chamber for enabling an electric current to be applied across said porous bodies, the assembly of hollow members, insulating and sealing means and porous bodies serving for forming an inner chamber communicating at one end with the inside of said outer chamber and at the other end with the outside of said outer chamber and being partitioned by said porous bodies, fluid supplied to said inlet being constrained to pass into said outer chamber, into said inner chamber, through said porous bodies where it can have transferred to it heat generated in said porous bodies by the electrical resistance thereof to the flow of electric current therethrough, and out of the inner and outer chambers via said outlet.

References Cited in the file of this patent

UNITED STATES PATENTS

| | | |
|---|---|---|
| 1,040,124 | Benham | Oct. 1, 1912 |
| 1,688,679 | Baum | Oct. 23, 1928 |
| 1,688,680 | Baum | Oct. 23, 1928 |
| 2,010,331 | Starrick | Aug. 6, 1935 |